United States Patent
Ohhashi et al.

(10) Patent No.: US 9,384,041 B2
(45) Date of Patent: Jul. 5, 2016

(54) INFORMATION PROCESSING SYSTEM FOR ENDING A FIRST PROGRAM WHEN A SECOND PROGRAM ENDS

(71) Applicants: Hideki Ohhashi, Kanagawa (JP); Kohichi Hirai, Kanagawa (JP)

(72) Inventors: Hideki Ohhashi, Kanagawa (JP); Kohichi Hirai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 123 days.

(21) Appl. No.: 14/293,297

(22) Filed: Jun. 2, 2014

(65) Prior Publication Data

US 2014/0359631 A1    Dec. 4, 2014

(30) Foreign Application Priority Data

Jun. 3, 2013    (JP) .................................. 2013-116700

(51) Int. Cl.
| | | |
|---|---|---|
| G06F 9/46 | (2006.01) | |
| G06F 9/48 | (2006.01) | |
| G06F 11/07 | (2006.01) | |

(52) U.S. Cl.
CPC ............ *G06F 9/485* (2013.01); *G06F 11/0709* (2013.01); *G06F 11/0769* (2013.01)

(58) Field of Classification Search
None
See application file for complete search history.

(56) References Cited

U.S. PATENT DOCUMENTS

| | | | | |
|---|---|---|---|---|
| 2009/0119553 | A1* | 5/2009 | Matsushima | 714/57 |
| 2009/0254917 | A1* | 10/2009 | Ohtani | 718/104 |
| 2011/0283296 | A1* | 11/2011 | Chun | 719/318 |
| 2012/0102373 | A1* | 4/2012 | Waugh | 714/57 |

FOREIGN PATENT DOCUMENTS

| | | |
|---|---|---|
| JP | 2002-330246 A | 11/2002 |
| JP | 2011-103572 A | 5/2011 |
| JP | 2012-160129 A | 8/2012 |
| JP | 2012-176588 A | 9/2012 |

OTHER PUBLICATIONS

Extended European Search Report issued on Sep. 4, 2014, in European Patent Application No. 14170587.1.
"Virtualizing Business-Critical Applications with Confidence Challenges using Traditional High-Availability Solutions High Availability in VMware Environments", Technical White Paper, Retrieved from the Internet: URL:http://www.vmware.com/files/pdf/techpaper/vsp4-virtualize-biz-critical-apps.pdf [retrieved on Aug. 28, 2014], XP055137131, Apr. 28, 2011, pp. 1-9.

* cited by examiner

*Primary Examiner* — Adam Lee
(74) *Attorney, Agent, or Firm* — Oblon, McClelland, Maier & Neustadt, L.L.P.

(57) ABSTRACT

An information processing system includes a detection unit configured to detect an end of a second application program that cooperates with a first application program operated by a user; a report unit configured to report the end to the first application program, and end the first application program; and a request unit configured to request a third application program to display information relevant to the end of the second application program.

7 Claims, 6 Drawing Sheets

INFORMATION PROCESSING SYSTEM FOR ENDING A FIRST PROGRAM WHEN A SECOND PROGRAM ENDS

BACKGROUND OF THE INVENTION

1. Field of the Invention

The present invention relates to an information processing system, an information processing method, and an information processing terminal.

2. Description of the Related Art

There is a system format in which two or more application programs (hereinafter, "applications") cooperate with each other in providing services to users. For example, in a client/server system, a service is provided by the cooperation of the application on the client side and the application on the server side. Furthermore, there are cases where a service is provided by the cooperation of an application that assumes the role of an interface such as GUI (Graphical User Interface) and an application that assumes the role of a business logic. Basically, one of the applications that cooperate with each other (hereinafter, "UI application") is directly operated by the user, and the other one of the applications (hereinafter, "logic application") executes a process in the background.

In the above system format, there are cases where the logic application abnormally ends due to some reason. In this case, the UI application loses the cooperation partner, and can no longer continue to perform normal processing, and is thus ended (terminated). However, an inconvenience arises when the UI application suddenly ends.

SUMMARY OF THE INVENTION

The present invention provides an information processing system, an information processing method, and an information processing terminal, in which one or more of the above-described disadvantages are eliminated.

According to an aspect of the present invention, there is provided an information processing system including a detection unit configured to detect an end of a second application program that cooperates with a first application program operated by a user; a report unit configured to report the end to the first application program, and end the first application program; and a request unit configured to request a third application program to display information relevant to the end of the second application program.

According to an aspect of the present invention, there is provided an information processing method executed by an information processing system, the information processing method including detecting an end of a second application program that cooperates with a first application program operated by a user; reporting the end to the first application program, and ending the first application program; and requesting a third application program to display information relevant to the end of the second application program.

According to an aspect of the present invention, there is provided an information processing terminal including a detection unit configured to detect an end of a second application program that cooperates with a first application program operated by a user; a report unit configured to report the end to the first application program, and end the first application program; and a request unit configured to request a third application program to display information relevant to the end of the second application program.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
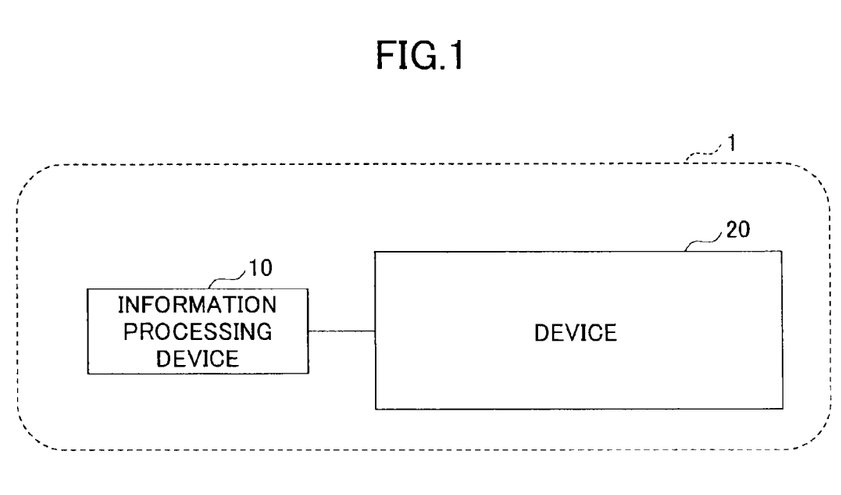
FIG. 1 illustrates a configuration example of an information processing system according to an embodiment of the present invention.

A description is given, with reference to the accompanying drawings, of embodiments of the present invention. FIG. 1 illustrates a configuration example of an information processing system according to an embodiment of the present invention. In an information processing system 1 illustrated in FIG. 1, a device 20 is communicably connected to an information processing device 10. Communication between the device 20 and the information processing device 10 is performed via USB (Universal Serial Bus), or a network such as Near Field Communication, and LAN (wired or wireless).

The device 20 is a device having an operation panel, such as an image forming apparatus, a projector, a TV conference system, a digital camera, etc.

The information processing device 10 is an electronic device that can execute complete image processing by itself, such as a smartphone and a tablet terminal. In the present embodiment, the information processing device 10 functions as an operation unit (operation panel) of the device 20. For example, the information processing device 10 is provided by being fixed to a predetermined position of the device 20 (for example, a position where the operation panel is arranged). Therefore, the information processing device 10 and the device 20 may be recognized as a single device. Furthermore, the information processing device 10 may be detachable (separable) from the device 20. In a state where the information processing device 10 is detached, the information processing device 10 may function as an operation unit of the device 20 via wireless communication, etc.

Figure 2:
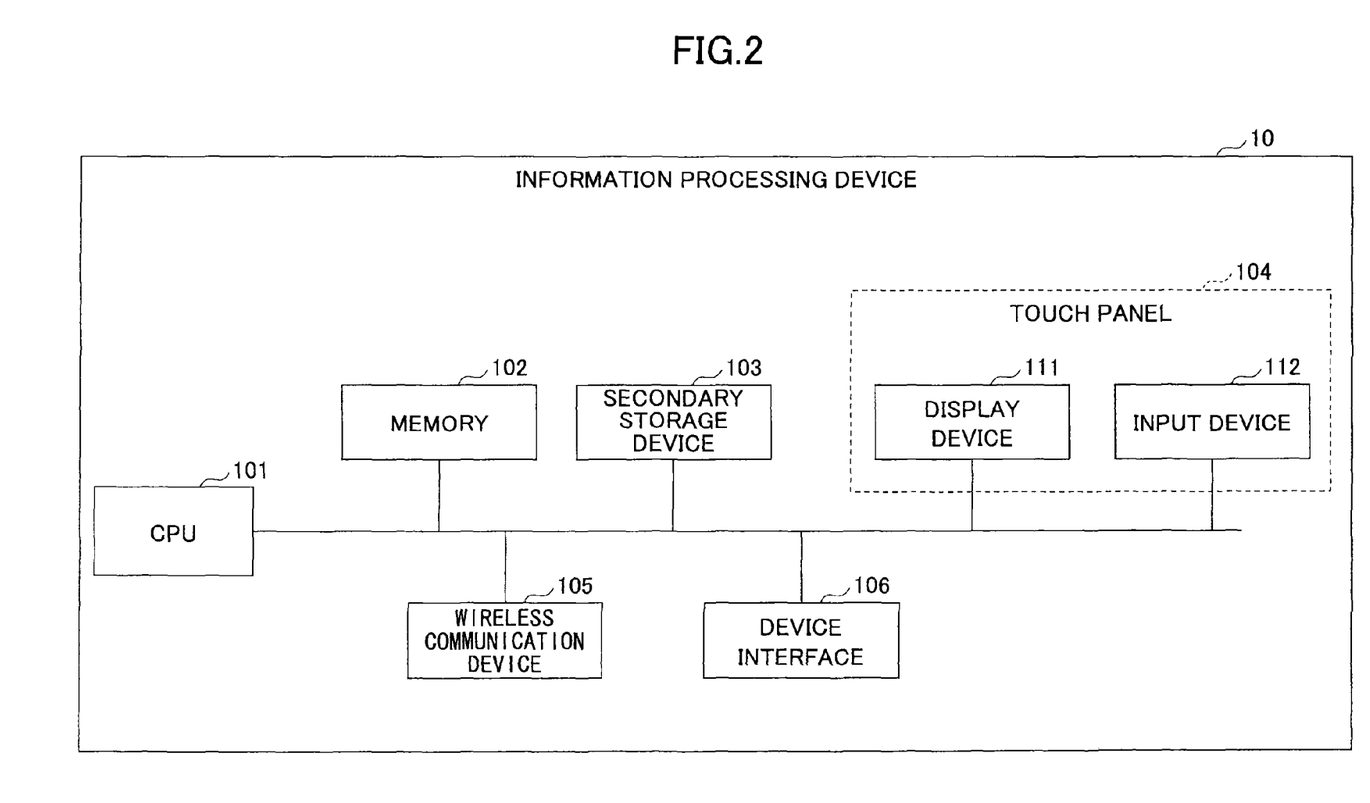
FIG. 2 illustrates a hardware configuration example of an information processing device according to an embodiment of the present invention.

FIG. 2 illustrates a hardware configuration example of an information processing device according to an embodiment of the present invention. In FIG. 2, the information processing device 10 includes a CPU 101, a memory 102, a secondary storage device 103, a touch panel 104, a wireless communication device 105, and a device interface 106.

The secondary storage device 103 stores programs, etc., installed in the information processing device 10. The memory 102 reads a program from the secondary storage device 103 and stores the program, when an instruction to activate the program is given. The CPU 101 realizes functions relevant to the information processing device 10 according to programs stored in the memory 102.

The touch panel 104 is an electronic component including both an input function and a display function, and displays information and receives input from a user. The touch panel 104 includes a display device 111 and an input device 112.

The display device 111 is a liquid crystal display, etc., and assumes the role of a display function of the touch panel 104. The input device 112 is an electronic component including a sensor for detecting the touch of an object touching the display device 111. The method of detecting the touch of a touching object may be any known method such as an electrostatic method, a resistance film method, or an optical method. Note that a touch object is an object that touches the contact surface (front surface) of the touch panel 104. Examples of such an object are the user's finger, an exclusive-use pen, and a general pen.

The wireless communication device 105 is an electronic component such as an antenna, which is needed for performing communication in a wireless LAN (Local Area Network) or a mobile communication network. The device interface 106 is an interface for communicating with the device 20.

Figure 3:
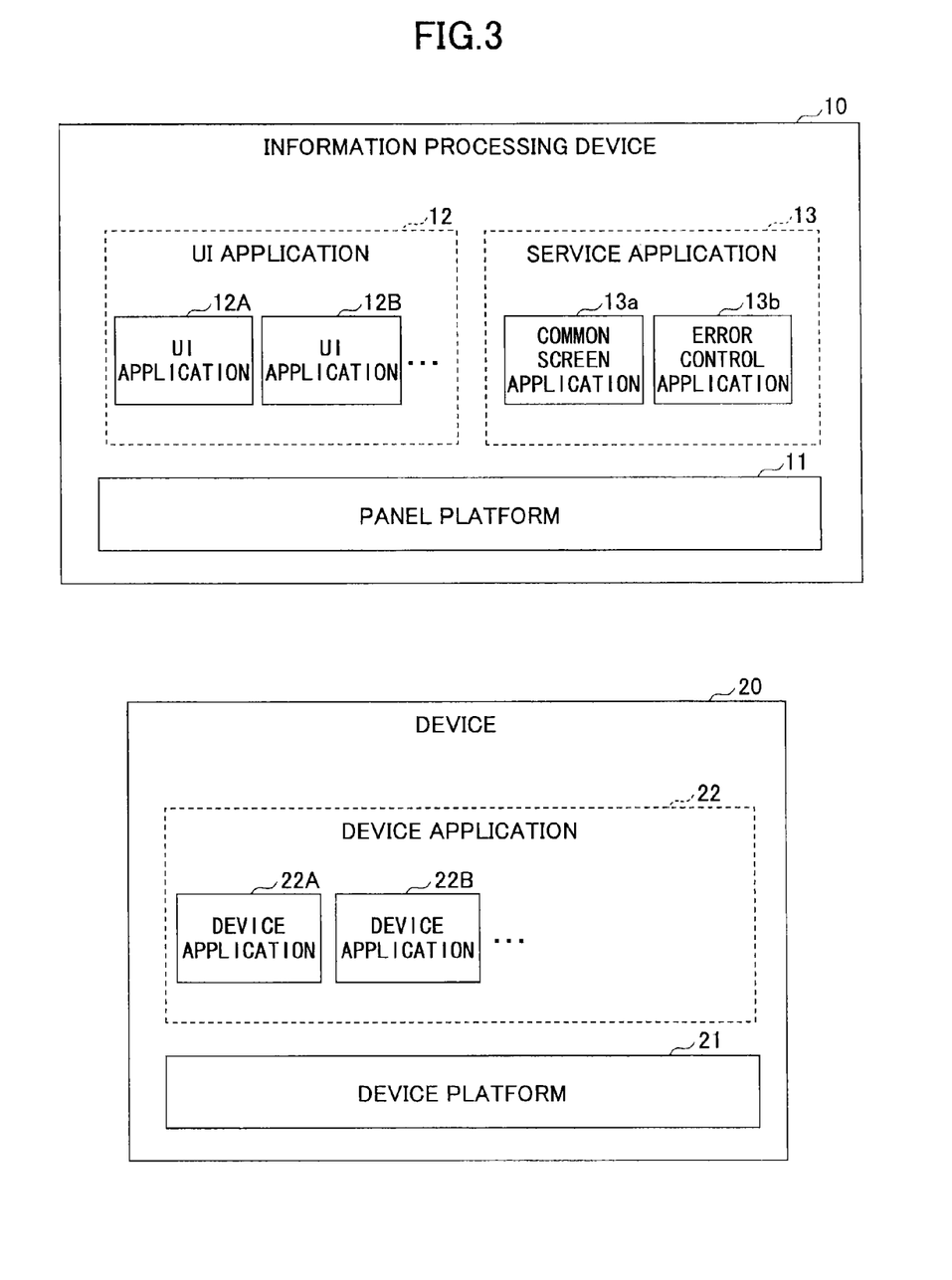
FIG. 3 illustrates a software configuration example of the information processing system according to an embodiment of the present invention.

FIG. 3 illustrates a software configuration example of the information processing system 1 according to an embodiment of the present invention. In FIG. 3, the device 20 includes a device platform 21 and one or more device applications 22 that operate on the device platform 21. These elements are programs for causing a CPU of the device 20 to execute predetermined processes.

The device platform 21 provides an environment for executing the device application 22. The device platform 21 implements control of activating and stopping the device application 22, and executes a function common to a plurality of device applications 22. For example, the common function is used from the device applications 22 via an API (Application Program Interface) included in the device platform 21. An example of the device platform 21 is an OS (Operating System). Furthermore, a device application 22 platform such as an OS and a Java (registered trademark) virtual machine may constitute the device platform 21.

The device application 22 is an application program for controlling the device 20 and causing the device 20 to execute a job (hereinafter, simply referred to as an "application"). In FIG. 3, the device application 22A and the device application 22B are illustrated as examples of the device application 22. In the present embodiment, the functions of the device application 22A and the device application 22B are not limited to particular functions.

Meanwhile, the information processing device 10 includes a panel platform 11 and a plurality of applications that operate on the panel platform 11. These elements are programs for causing the CPU 101 to execute predetermined processes.

The panel platform 11 provides an environment for executing applications. The panel platform 11 implements control of activating and stopping an application, and executes a function common to a plurality of applications. For example, the common function is used from the applications via an API included in the panel platform 11. Furthermore, the panel platform 11 may control the login of the user to the information processing device 10. Note that an example of the panel platform 11 is an OS (Operating System). Furthermore, application platforms such as an OS and a Java (registered trademark) virtual machine may constitute the panel platform 11.

In the present embodiment, the applications of the information processing device 10 are classified into UI applications 12 and service applications 13 according to its role. The UI application 12 is an application that assumes the responsibility of cooperating with the device application 22 and providing a user interface such as a screen relevant to the device application 22 of the cooperation partner. That is to say, the UI application 12 is an application that is directly used by the user. In FIG. 3, the UI application 12A and the UI application 12B are illustrated as examples of the UI application 12. In the present embodiment, the UI application 12 and the device application 22 are associated with each other in a one-on-one manner. The UI application 12A is the UI application 12 for cooperating with the device application 22A. The UI application 12B is the UI application 12 for cooperating with the device application 22B.

The service application 13 is an application for providing services that are commonly used by the UI application 12. In FIG. 3, a common screen application 13a and an error control application 13b are illustrated as examples of the service application 13. The common screen application 13a is the service application 13 that executes the displaying of a common screen (hereinafter, "common screen") to the UI applications 12. An example of such a common screen is a screen for displaying information relevant to abnormalities on the side of the device application 22. Functions of the error control application 13b are described below.

Figure 4:
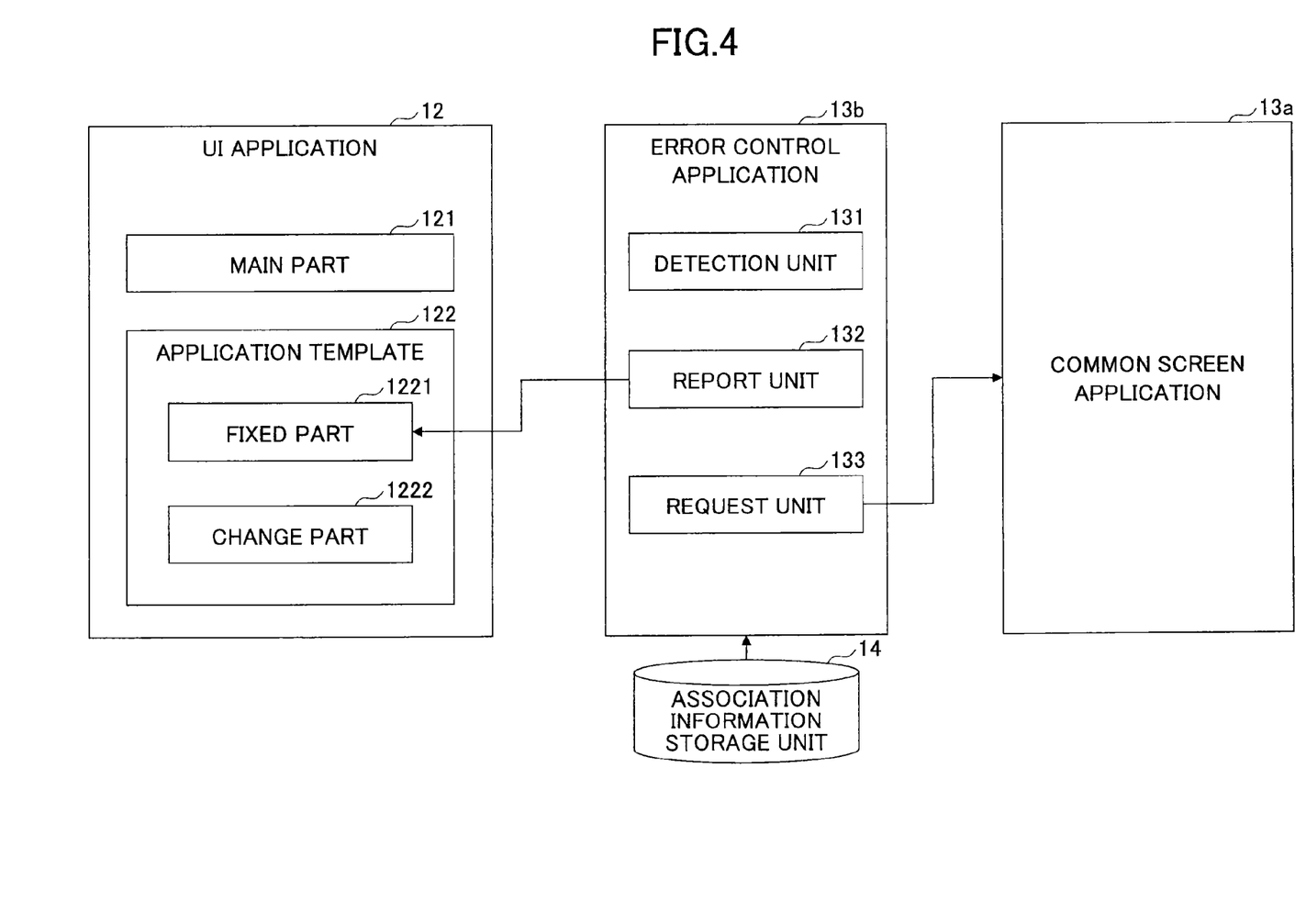
FIG. 4 illustrates a functional configuration example of a UI applications and an error control application.

Detailed descriptions are given of the UI applications 12 and the error control application 13b. FIG. 4 illustrates a functional configuration example of the UI applications 12 and the error control application 13b.

As illustrated in FIG. 4, the UI applications 12 such as the UI application 12A and the UI application 12B include a main part 121 and an application template 122. The main part 121 is the part on which a process unique to the UI application 12 has been executed. That is to say, the main part 121 is the part for realizing the essential function of the corresponding UI application 12.

The application template 122 is a part common to the UI applications 12, and a part that is implemented as a template created in advance. For example, to the developer of the UI application 12, the source code of the application template 122 may be distributed, or an object code in which the source code is compiled may be distributed. When a source code is distributed, the information processing device 10 is preferably provided with a mechanism for checking whether the source code has been altered.

The application template 122 includes a fixed part 1221 and a change part 1222. The fixed part 1221 includes an interface that can be called from outside (for example, the service application 13) and a fixed implementation with respect to the interface, which are to be included in the UI application 12. A fixed implementation is an implementation that is prohibited from being overwritten. Therefore, the fixed part 1221 is an implementation common to a plurality of UI applications 12. In the present embodiment, the fixed part 1221 includes an interface for receiving a report indicating the end of the device application 22 that is the cooperation partner, and an implementation of an ending (terminating) process in response to the report. The change part 1222 is a part for providing a mechanism for customizing part of the fixed part 1221. Therefore, at the change part 1222, it is possible to make a change unique to each UI application 12, with respect to the ending process executed by the fixed part 1221. However, the range in which customization is possible is limited according to the change part 1222. For example, among the processes implemented in the fixed part 1221, it is not possible to remove, from the change part 1222, a process that is a prerequisite for the UI application 12 to execute, among the processes implemented in the fixed part 1221. Basically, in the fixed part 1221, a new process is added, with respect to the ending process executed by the fixed part 1221. For example, an example of customization in the change part 1222 is a process deleting an operation file unique to a particular UI application 12.

When object-oriented programming is used for implementing the UI application 12, the change part 1222 may be a sub class of the fixed part 1221. In this case, in the sub class, customization of the ending process is performed. Alternatively, the change part 1222 may be a predetermined function that the fixed part 1221 is scheduled to call at a predetermined timing. In this case, in the predetermined function, a customization process of a screen displayed by the fixed part 1221 is performed. Alternatively, the change part 1222 may be a script file that the fixed part 1221 reads at a predetermined timing. In this case, in the script file, a script is described, which indicates the customization process of the screen displayed by the fixed part 1221. The fixed part 1221 interprets the script, and executes the process defined in the script at the time of the ending process. Alternatively, the change part 1222 may be a setting file that the fixed part 1221 reads. In this case, in the setting file, for example, the fixed part 1221, in which a list of file names to be deleted is set, executes the deleting of files relevant to the file names described in the setting file.

Meanwhile, the error control application 13b includes a detection unit 131, a report unit 132, and a request unit 133. The detection unit 131 detects the end of the device application 22. The detection target may be limited to an ending caused by an abnormality. The report unit 132 reports the end of the device application 22 to the UI application 12 that cooperates with or corresponds to the device application 22 whose end is detected by the detection unit 131. The association relationship between the device application 22 and the UI application 12 can be identified by referring to an association information storage unit 14. The association information storage unit 14 stores, in association with each other, the identification information of the device application 22 and the identification information of the UI application 12 that cooperate with each other. For example, the association information storage unit 14 may be realized with the use of the secondary storage device 103 or the memory 102. Note that the identification information of the device application 22 and the identification information of the UI application 12 are hereinafter referred to as an "application ID". The request unit 133 requests the common screen application 13a to display a screen indicating information relevant to the end of the device application 22, in response to the detection unit 131 detecting the end of the device application 22.

Figure 5:
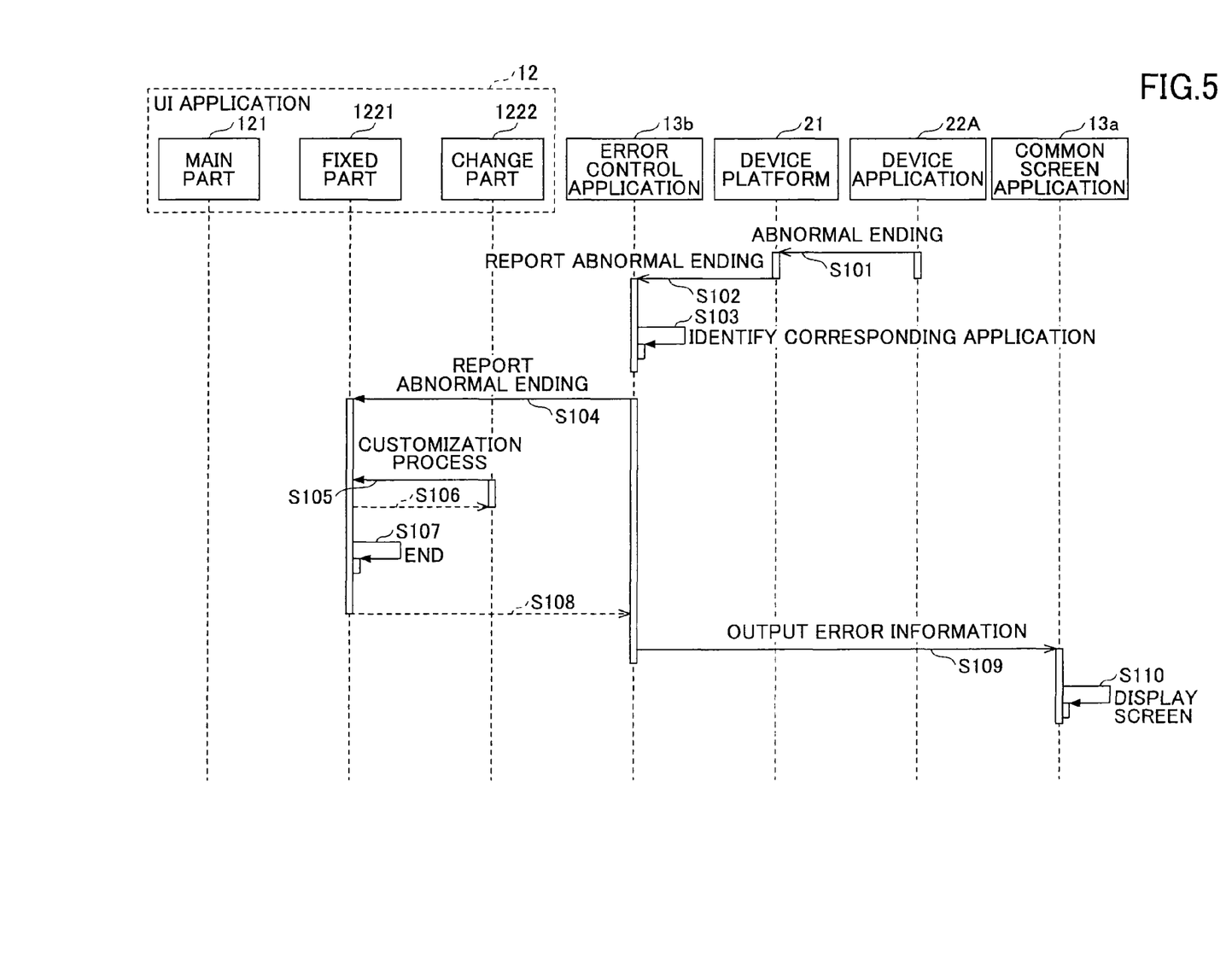
FIG. 5 is a sequence diagram for describing a first example of processing procedures executed by the information processing system.

In the following, a description is given of processing procedures executed in the information processing system 1. FIG. 5 is a sequence diagram for describing a first example of processing procedures executed by the information processing system 1. The initial state of FIG. 5 is assumed to be a state in which the device application 22A and the UI application 12A are respectively activated, and by the cooperation of the device application 22A and the UI application 12A, execution of a process requested by a user has started.

During the execution of the process, when an abnormality occurs and the device application 22A ends (terminates) (step S101), the device platform 21 specifies the application ID of the device application 22A, and sends a report of the abnormal ending of the device application 22A, to the error control application 13b (step S102). In response to the report, the detection unit 131 of the error control application 13b detects the end of the device application 22A. Note that the report may include information indicating the factor of the abnormal ending (for example, an error code). Furthermore, the report of the abnormal ending may be sent from the device platform 21 to the panel platform 11, and then the panel platform 11 may transmit the report to the error control application 13b.

Next, the report unit 132 of the error control application 13b refers to the association information storage unit 14 and identifies the application ID of the UI application 12 corresponding to the application ID specified in the report of the abnormality ending (step S103). Here, the application ID of the UI application 12A is identified. Then, the report unit 132 sends the report of the abnormal ending of the device application 22A, to the UI application 12A (step S104). The communication between the applications may be realized by using a known technology such as inter-process communication, events, or signals.

The fixed part 1221 of the UI application 12A starts the ending process in response to the report. In the process of performing the ending process, the fixed part 1221 uses the change part 1222 to execute a customization process (step S105). A customization process is an ending process unique to the UI application 12A. When the customization process ends (step S106), the fixed part 1221 ends the process or the thread of the UI application 12A (step S107).

When the end event of the UI application 12A is detected by the error control application 13b (step S108), the request unit 133 of the error control application 13b requests the common screen application 13a to output the error information indicating the abnormal ending of the device application 22 (step S109). This request may include information indicating the factor of the abnormal ending, included in the report of the abnormal ending.

The common screen application 13a displays an error screen indicating error information in response to the request (step S110). The error screen may display that the device application 22A has abnormally ended, and may display the factor of the abnormal ending.

Figure 6:
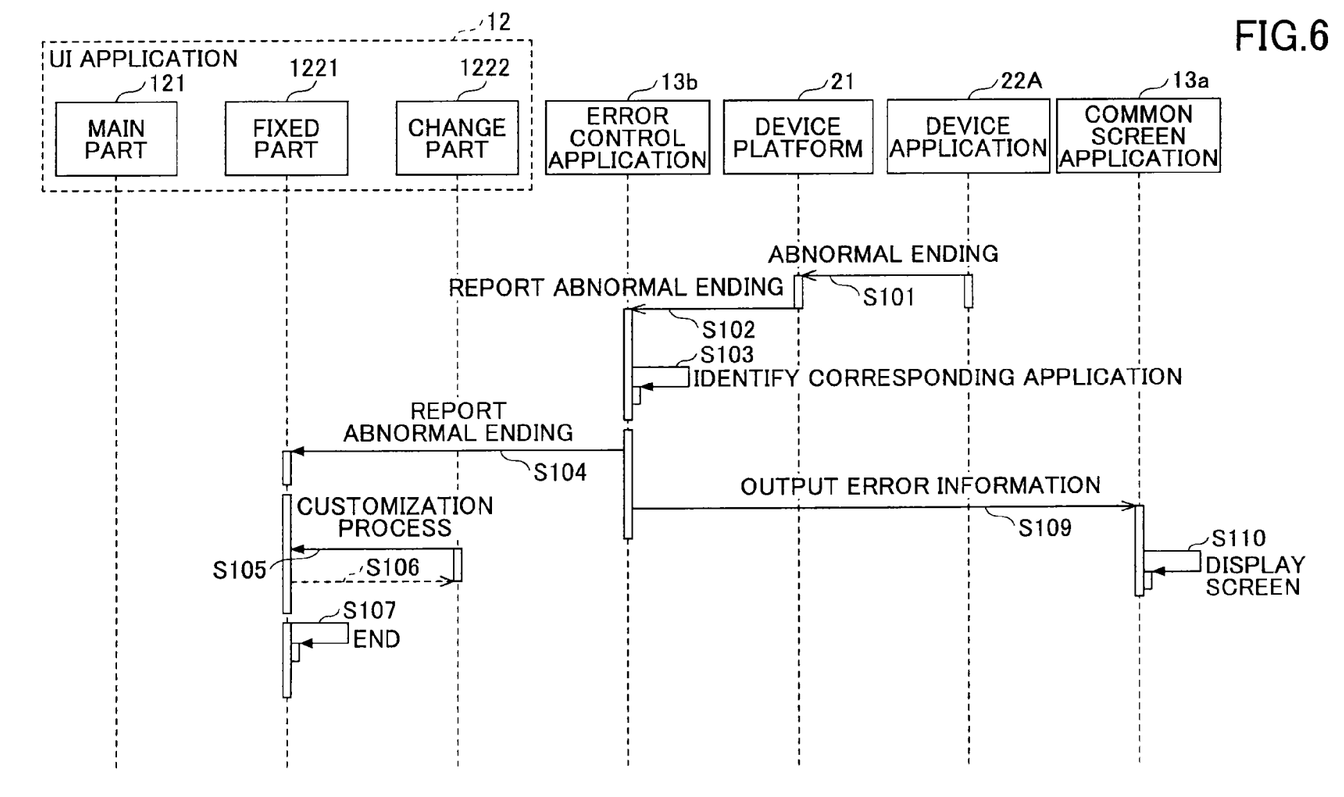
FIG. 6 is a sequence diagram for describing a second example of processing procedures executed by the information processing system.

The processing procedures described with reference to FIG. 5 may be replaced with the processing procedures as illustrated in FIG. 6. FIG. 6 is a sequence diagram for describing a second example of processing procedures executed by the information processing system 1. In FIG. 6, the same steps as those of FIG. 5 are denoted by the same step numbers, and descriptions thereof are appropriately omitted.

In FIG. 6, the request unit 133 of the error control application 13b requests the common screen application 13a to output error information without waiting for the UI application 12A to end, which is the point that is different from FIG. 5. That is to say, the ending of the UI application 12A and the output of the error information are executed without being in synchronization with each other. In these procedures also, it is possible to report, to the user, the end of the device application 22A, which is the factor causing the end of the UI application 12A.

As described above, according to the present embodiment, when the device application 22 has ended, the displaying of the screen indicating the ending is performed in an integrated manner by the common screen application 13a. Therefore, in each UI application 12, it is possible to reduce the need of performing the implementation for displaying the screen, and uniformity of the screens can be expected. Furthermore, in a part such as the panel platform 11 on which a plurality of programs depend, it is possible to reduce the need of performing the implementation for displaying the screen. Furthermore, compared to the case where the process of displaying the screen is implemented at the UI application 12, the usage amount of the memory can be expected to decrease.

Furthermore, when the device application 22 ends, the process to be executed by the UI application 12 that is cooperating with the device application 22 is implemented in advance in the fixed part 1221 of the application template 122.

Therefore, the man-hours for developing the UI application 12 can be expected to decrease. Furthermore, the operations of the UI application 12 can be expected to be uniform, when the device application 22 ends.

Note that the fixed part 1221 of the UI application 12 does not necessarily need to be distributed in the format of the application template 122. For example, an interface to be implemented in the UI application 12 may be defined, and implementation of the part corresponding to the fixed part 1221 may be transferred to the developer of each UI application 12. In this case, the degree of freedom increases in the implementation with respect to the interface, and therefore the change part 1222 need not be provided.

Furthermore, the present embodiment may be applied to a system including an application operating in one of the computers and an application which cooperates with the application and which operates in another computer, in computers connected to each other via a network.

In the present embodiment, the UI application 12 is an example of a first application program, the device application 22 is an example of a second application program, a screen display application is an example of a third application program, the fixed part 1221 is an example of a common part, and the change part 1222 is an example of a unique part.

In the conventional system format, there are cases where the logic application abnormally ends due to some reason. In this case, the UI application loses the cooperation partner, and can no longer continue to perform normal processing, and is thus ended (terminated). However, an inconvenience arises when the UI application suddenly ends.

One approach to overcome the inconvenience is to display a screen indicating that an abnormality has occurred in the logic application. Such a screen is common to a plurality of UI applications, and therefore if the screen is displayed by a system providing an execution environment for the application such as an OS (Operating System) and an application platform, it is possible to reduce the man-hours for developing the application.

However, the system is depended on by a plurality of applications and other programs, etc., and therefore modification of the system generally has an impact on a wide range. Thus, a conventional mechanism, which demands the modification of the system in accordance with the addition of a new screen, is not a desirable mechanism.

Meanwhile, when a conventional screen as described above needs to be implemented for each application, various problems may arise, such as the increase in the man-hours for developing the application, the lack of uniformity of the screens, and a delay in providing a screen operated by the user.

According to one embodiment of the present invention, an information processing system, an information processing method, and an information processing terminal are provided, which are capable of providing a new display mechanism relevant to a screen common to a plurality of applications.

The information processing system, the information processing method, and the information processing terminal are not limited to the specific embodiments described herein, and variations and modifications may be made without departing from the spirit and scope of the present invention.

The present application is based on and claims the benefit of priority of Japanese Priority Patent Application No. 2013-116700, filed on Jun. 3, 2013, the entire contents of which are hereby incorporated herein by reference.

What is claimed is:

1. An information processing system, comprising:

processing circuitry configured to detect an end of a second application program that cooperates with a first application program operated by a user, report the end of the second application program to the first application program, end the first application program, and request a third application program to display information relevant to the end of the second application program, wherein the first application program includes a common part that is commonly implemented in a plurality of first application programs, the processing circuitry identifies the first application among the plurality of first application programs, based on identification information of the second application program, and sends a report indicating the end of the second application program to the common part of the first application program, and the common part causes the processing circuitry to execute the ending of the first application program, in response to receiving the report.

2. The information processing system according to claim 1, wherein the first application program includes a unique part configured to perform a change that is customized for each of the first application programs, with respect to a part of the common part, and the unique part causes the processing circuitry to execute a process that is customized for the first application program, before the common part causes the processing circuitry to execute the ending of the first application program.

3. The information processing system of claim 1, wherein the processing circuitry receive an application identifier as the identification information, and identifies the first application using the received application identifier and information stored in a memory regarding the plurality of first application programs.

4. An information processing method executed by an information processing system, the information processing method comprising:

detecting an end of a second application program that cooperates with a first application program operated by a user, wherein the first application program includes a common part that is commonly implemented in a plurality of first application programs;

identifying the first application among the plurality of first application programs, based on identification information of the second application program;

reporting the end of the second application program to the first application program, and ending the first application program, wherein the reporting includes sending a report indicating the end of the second application program to the common part of the first application program; and requesting a third application program to display information relevant to the end of the second application program, wherein the common part causes the information processing system to execute the ending of the first application program, in response to the report sent in the reporting step.

5. The information processing method according to claim 4, wherein
the first application program includes a unique part configured to perform a change that is customized for each of the first application programs, with respect to a part of the common part, and
the unique part causes the information processing system to execute a process that is customized for the first application program, before the common part causes the information processing system to execute the ending of the first application program.

6. An information processing terminal, comprising:
processing circuitry configured to detect an end of a second application program that cooperates with a first application program operated by a user, report the end of the second application program to the first application program, end the first application program, and request a third application program to display information relevant to the end of the second application program,
wherein the first application program includes a common part that is commonly implemented in a plurality of first application programs,
the processing circuitry identifies the first application among the plurality of first application programs, based on identification information of the second application program, and sends a report indicating the end of the second application program to the common part of the first application program, and
the common part causes the processing circuitry to execute the ending of the first application program, in response to receiving the report.

7. The information processing terminal according to claim 6, wherein
the first application program includes a unique part configured to perform a change that is customized for each of the first application programs, with respect to a part of the common part, and
the unique part causes the processing circuitry to execute a process that is customized for the first application program, before the common part causes the processing circuitry to execute the ending of the first application program.

\* \* \* \* \*